United States Patent [19]
Kovar

[11] Patent Number: 4,882,970
[45] Date of Patent: Nov. 28, 1989

[54] MOTION TRANSLATOR

[75] Inventor: Jay R. Kovar, Ridgecrest, Calif.

[73] Assignee: The United States of America as represented by the Secretary of the Navy, Washington, D.C.

[21] Appl. No.: 295,085

[22] Filed: Jan. 4, 1989

[51] Int. Cl.⁴ .......................... B64D 1/04; F42C 5/00; F42C 15/12

[52] U.S. Cl. .................................. 89/1.55; 74/99 R; 102/226

[58] Field of Search ...................... 102/225, 226, 227; 89/1.55; 74/99 R, 104

[56] References Cited

U.S. PATENT DOCUMENTS

| | | | |
|---|---|---|---|
| 2,497,762 | 2/1950 | Davis | 74/104 |
| 2,648,351 | 8/1953 | Curtis et al. | 74/104 |
| 3,119,594 | 1/1964 | Heggem | 74/104 |
| 3,570,835 | 3/1971 | McPherson | 74/104 |
| 3,738,222 | 6/1973 | Halpern et al. | 89/1.55 |
| 3,760,682 | 9/1973 | Dexter | 89/1.55 |
| 3,945,295 | 3/1976 | Robinson | 89/1.55 |
| 3,960,086 | 6/1976 | Fisher | 102/226 |
| 3,961,577 | 6/1976 | O'Steen | 102/226 |
| 3,983,784 | 10/1976 | Maughlin | 89/1.55 |
| 3,998,124 | 12/1976 | Milhous et al. | 89/1.55 |
| 4,478,127 | 10/1984 | Hennings et al. | 89/1.55 |
| 4,479,417 | 10/1984 | Billard et al. | 89/1.55 |
| 4,520,711 | 6/1985 | Robinson | 89/1.55 |

Primary Examiner—David H. Brown
Attorney, Agent, or Firm—William C. Townsend; Melvin J. Sliwka; Stuart H. Nissim

[57] ABSTRACT

A motion translating device for receiving a force input from one direction and translating it mechanically by combined linear and rotational components into a resultant motion is a different direction. The apparatus consists of a slotted frame member having a base for mounting to another object such as an airborne weapon and a pair of separated, parallel and vertical walls extending upwards from the base. A slotted slide member is movably contained between the two walls so that when a generally horizontal force is applied to one end of that member by way of a cable connected between that other object and said one end of the slide member, the slide member is caused to move forward thru the frame member while simultaneously its opposite end is caused to rotate upwards away from the frame member. A device linked to that latter end will thus be lifted and simultaneously rotated so that its longitudinal axis initially normal to the longitudinal axis of the other object is finally parallel to that axis when the device is lifted out of its stored position within that other object.

15 Claims, 2 Drawing Sheets

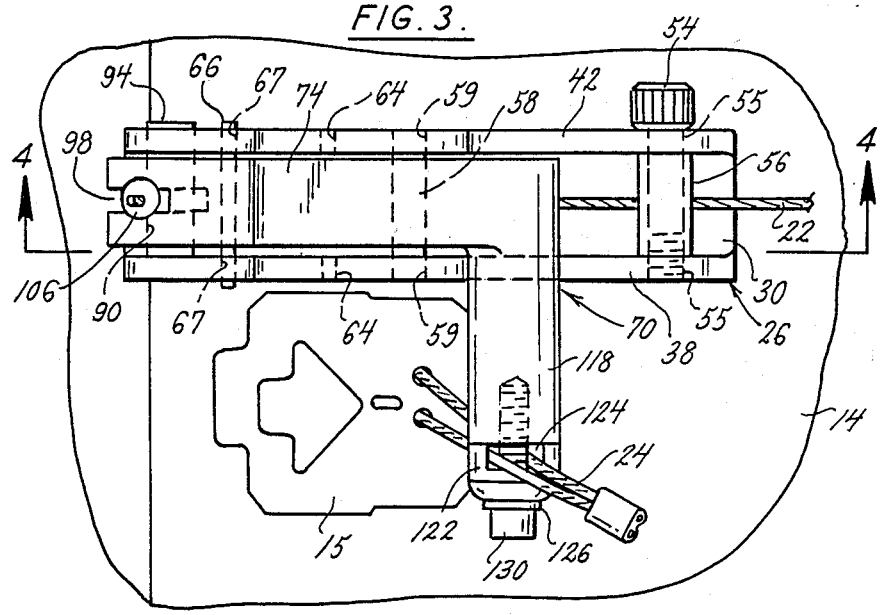
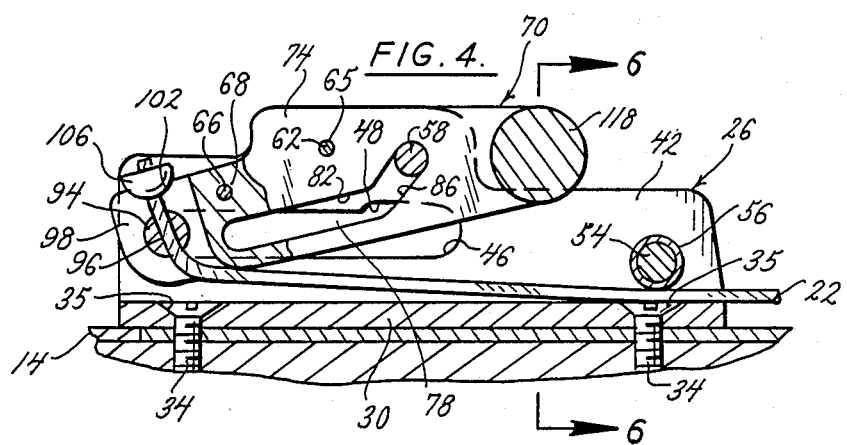
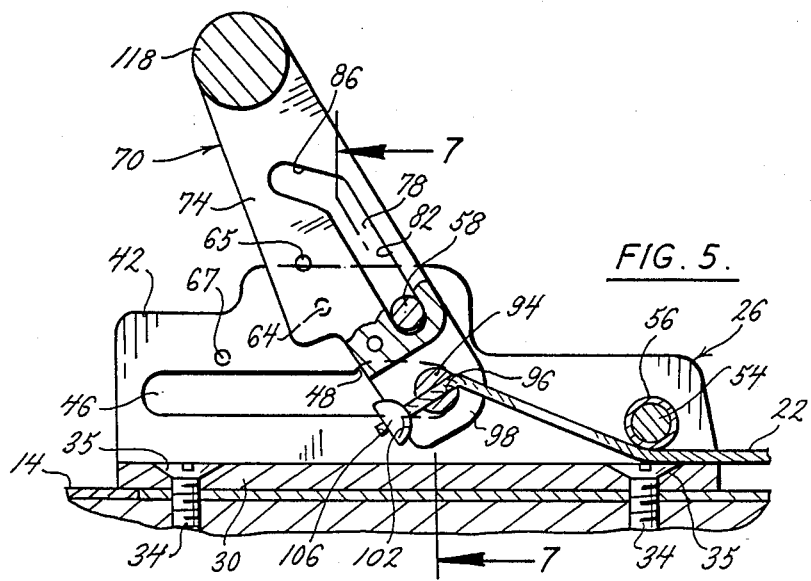

MOTION TRANSLATOR

FIELD OF THE INVENTION

The present invention is a motion translation device, and more particularly a device for translating motion in one direction to motion normal to that direction, or to a different direction.

BACKGROUND OF THE INVENTION

There are a variety of applications, particularly in hostile or remotely located environments where an object is required to be moved in one direction by a force that can only be applied from a different direction. One such application to which the present invention is particularly directed involves the deployment of a ram air turbine (RAT) to electrically actuate the rocket motor of a missile or rocket propelled bomb. The prior method of firing such a rocket motor was by the strike of a hammer arm. When such a method is employed, an inadvertent "deck" drop of the weapon or premature firing action during a normal drop of the weapon are hazards to which the operations personnel and equipment are occasionally subjected. The more manageable and safer method of firing such a rocket motor requires the availability of an electrical pulse. Such a pulse is provided from a circuit supplied by a Ram Air Turbine positioned in an airflow of at least 100 knots velocity. The turbine is mounted within the body of the weapon in its storage compartment just beneath the surface of the weapon such that its longitudinal axis is facing radially inward normal to the main axis of the weapon. In order to remove the RAT from its storage compartment or chamber, and position it for operation, it must be lifted radially out of the chamber and simultaneously rotated so that its rotational axis is generally parallel to the main axis of the weapon upon which it is secured and it is facing directly into the air flow over the weapon's surface. Since both a lifting and rotating force is required to remove and position the RAT for use and since the forces and components of forces potentially available by way of the cable between the weapon rack on the launch aircraft and the RAT in the launched weapon are dependent to varying degrees on the vagaries of launch environment and operations variables, an apparatus is needed to accept a spectrum of input forces from different directions in front of the stowed RAT and convert them into a managed and repeatable force program consisting of a continuum of vertical lifting and rotational components. The present invention is an apparatus that accepts such a spectrum of input forces and focuses them for a given weapon launch into a generally horizontally acting force which is continually, during the time of its effect, translated into the required vertical lifting and rotational components necessary to remove the RAT and operationally position it for use. When the turbine has been removed from the storage chamber and positioned in the air flow past the weapon, the RAT is caused to begin operating and producing an electrical signal which can then be used in a controlled fashioned to fire the rocket motor. The rocket motor thus activated to propel the weapon to its target at an appropriate controllable time such that the aircraft is not subjected to any detrimental effects of the motor firing. In addition, of course, the use of the electrical signal provided by the ram air turbine substantially eliminates the likelihood of an inadvertent deck drop of the weapon causing an undesirable or unexpected firing of the rocket motor in the immediate presence of operating personnel or equipment.

SUMMARY OF THE INVENTION

It is thus an object of the present invention to provide an apparatus for simultaneously lifting and rotating a device in one direction in response to the application of a force from another and different direction and plane.

It is another object of the present invention to provide an apparatus which will cause a cable borne force from various angles in one direction to be focused into a horizontal force in that same general direction while simultaneously translating that force into a continuum of vertical lifting and rotational components.

It is yet another object of the present invention to provide a reliable apparatus for translating a force input from one direction into a continuum of forces acting in a different direction and in a continuum of planes intersecting the plane of the input.

Still another object of the present invention is to provide an apparatus capable of mechanically translating a force applied from one direction into a continuum of forces acting in a different and planes without mechanical binding or failure.

Specifically the present invention consists of a frame member having a slot in one of its two walls extending between its two walls through a slot in a slidable arm which also bears a pin which protrudes from the side of the slidable arm at one of its ends into the slot located in the wall of the frame member facing the pin normal to the arm and on the side of the arm opposite to the protruding pin. One end of a cable is connected to the free end of the arm extension and the other end is attached to the stored ram air turbine within the body of the weapon. When a force is applied from a cable connected between the weapons launch rack attached to the aircraft and the end of the slidable arm opposite the end connected to the RAT, the end of the arm connected to the RAT is caused to move through an arcuate path in a direction opposite the direction of the applied force and to be rotated simultaneously so that the applied horizontal force is translated into a vertical force which then acts upon the stored RAT by lifting it radially outward from its storage chamber in the body of the weapon and rotating it so that its main axis of rotation is in line with the direction of flow of the air stream over the surface of the weapon of flow of the air stream over the surface of the weapon and generally in the direction of the longitudinal axis of the weapon. The objects, features, and advantages of the present invention will be more clearly understood when the detail, and operation description herein is read with reference to the accompanying drawings.

BRIEF DESCRIPTION OF THE DRAWINGS

FIG. 3 is a top view of the present invention in relation to a stowed ram air turbine to which it is mechanically connected.

FIG. 4 is a partial sectional side view of the invention in the pre-flight condition taken along line 4—4 in FIG. 3.

FIG. 5 is a partial sectional view of the invention in the post launch condition taken along line 4—4 in FIG. 3.

DETAILED DESCRIPTION

Figure 1:
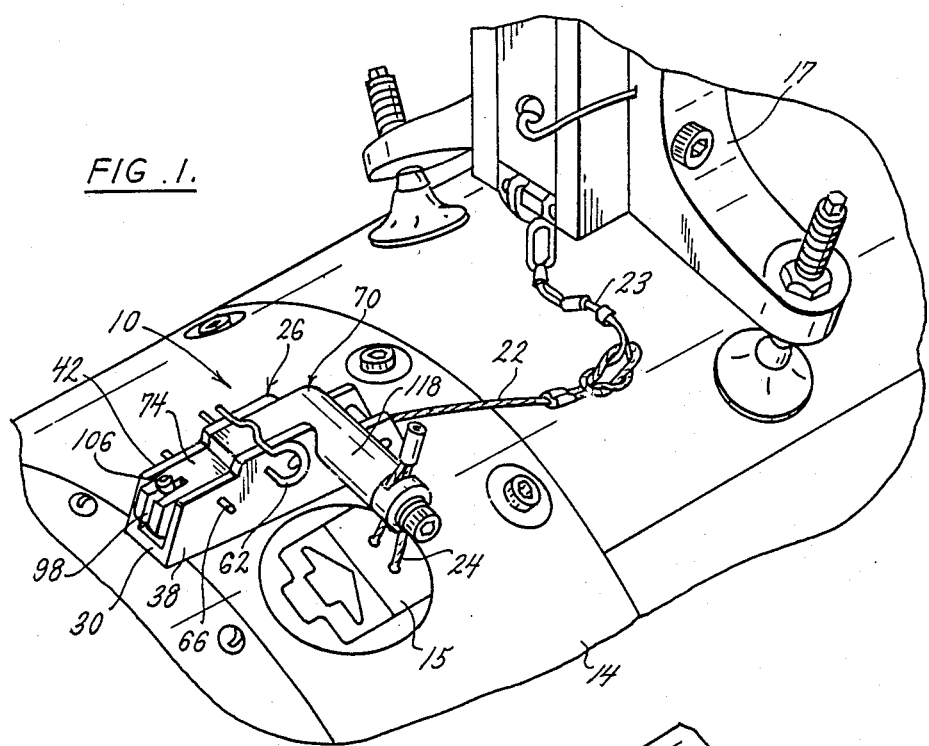
FIG. 1 is a perspective view of the invention mounted upon the surface of a missile pre-launch.
Figure 2:
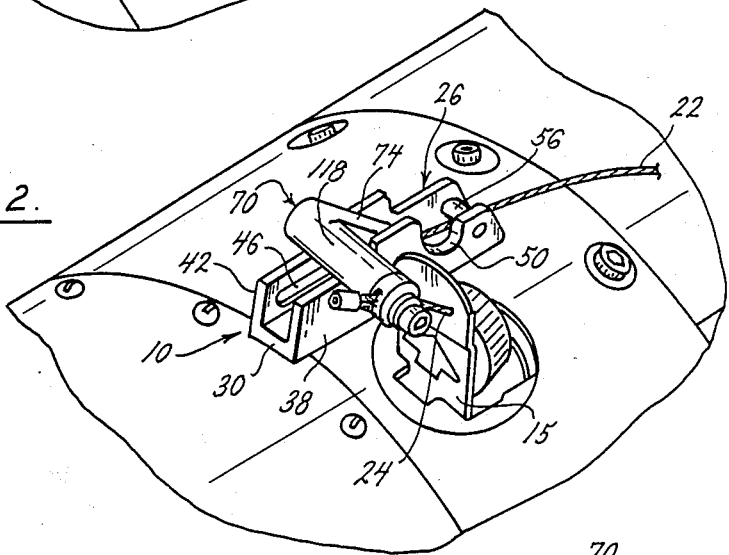
FIG. 2 is a perspective view of the invention mounted on the surface of a missile post-launch.

With reference to FIG. 1, the motion translator 10 is shown mounted to the airframe 14 of the weapon adjacent to the ram air turbine (RAT) 15 which is attached to the weapon at a point which may be located anywhere from 6 to 48 inches behind the weapon rack at no more than 30° to either side of the longitudinal axis of the weapon rack 17. The motion translator 10 consists of the frame member 26 and the slidable arm 74 which has the arm extension 118. The cable 22 which has a single strand release segment 23, connects between the weapon rack 17 and the cable termination 106 at one end of the slidable arm 74. A cable 24 connects between the free end of the arm extension 118 and the ram air turbine 15 which is shown in its stored, nonoperative condition, within the body of the weapon 14. The ram air turbine 15 is shown in FIG. 2 removed from its storage location within the body of the weapon 14 and positioned for operation on the surface of the weapon with its axis of rotation aligned generally in parallel with the longitudinal axis of the weapon 14. The arm 74 in FIG. 2 is shown in its position relative to the frame member 26 after actuation by a pulling force being applied to the arm 74 by means of the cable 22.

The frame member 26, shown in FIGS. 3, 4, and 5 consists of the base 30 which contains countersunk mounting holes 35 for securing the motion translator 10 to the air frame 14 of a weapon be means of screws 34. A pair of parallel walls 38 and 42 extend vertically upwards from and normal to the base 30, as clearly seen in FIG. 6 and 7. The wall 42 has a medially disposed elongated slot 46 extending longitudinally from one end towards the opposite end. At the point between the midpoint of the length of wall 42 and that opposite end, the slot 46 widens upward from the direction of the base 30 into the slot extension 48. The wall 38 has the cradle 50 at its end across from the end wall 42 bearing the slot extension 48.

Figure 7:
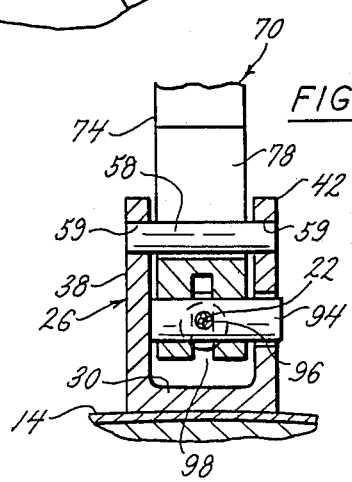
FIG. 7 is a partial sectional view of the present invention taken along line 7—7 of FIG. 5.

As seen in FIG. 3, the walls 38 and 42 contain oppositely facing aligned and paired bolt holes 55, slide control pin holes 59, lock pin holes 64, and shear pin holes 67 spaced from each other and from the end of the frame member 26 in which the cradle 50 (FIG. 2) and slot extension 48 (FIGS. 4 and 5) are located to the opposite end. FIG. 3 shows the bolt 54 extending through the cylindrical collar 56 between the interior facing surfaces of walls 38 and 42 through the holes 55 in those walls. The bolt 54 may extend through the wall 38 and thereafter be secured by a nut and lockwasher or it may be secured in a threaded hole 55 in wall 38. The lock pin 62 is shown in FIG. 1 in place between the lock pin holes 64 as shown in FIG. 3. Slide arm control pin 58 visible in FIGS. 4 and 5 is seen in FIG. 7 extending between the walls 38 and 42 in the opposed aligned holes 59 which are located between the bolt holes 55 and the lock pin holes 64 seen in FIG. 3. Finally, the shear pin 66 is seen in FIG. 3 extending between the walls 38 and 42 through a secure friction fit in the opposed aligned shear pin holes 67.

The slide member 70 which consists of the slide arm 74 and the slide arm extension 118 is shown in FIGS. 3, 4, and 5. An elongated slot 78, FIGS. 4 and 5, which is parallel to the bottom of the slide arm 74 and has a first leg 82 and a second leg 86 extending upwards at an angle from the first leg, extends laterally through the arm 74. At the end of the arm 74 opposite the arm extension 118 the slot 98 in FIG. 3 extends inward from the top to the bottom of the arm along and coincident with its longitudinal axis, and orthogonally disposed in relation to the slot 78. A pair of opposed and aligned holes 90, as seen in FIG. 3 extend laterally through the end of the arm 74 on a centerline normal to the longitudinal axis of the arm 74. The arm pin 94 is shown in FIG. 3 extending through the holes 90 and the slot 98 in between, with one end of the pin flush with the side of the arm 74 from which the arm extension 118 is disposed, and the other end of the pin 94 extending out of the opposite side of the arm 74 and through the slot 46 in the wall 42 of the frame member 26. A shaped receptacle 102, seen in FIGS. 4 and 5, having a generally concave upward curvature is located on the top of the end of the arm 74 in which the pin 94 is located. The shaped receptacle 102 is centered upon the slot 98 and is located immediately above the pin 94 when it is in place. The locking pin holes 65 and the shear pin hole 68 extend laterally through the arm 74 in the slide member 70 above the slot 78 positioned, as will be seen in the discussion which follows, to coincide with the corresponding lock pin holes 64 and shear pin holes 67, respectively, in the frame member 26, as shown in FIG. 3.

FIG. 3, 4, and 5 reveal details of assembly of the slide member 70. Specifically, referring to FIG. 3 the end of the slide member 70 having the shaped receptacle 102 is introduced to the frame member 26 between the walls 38 and 42. The pin 94 is introduced through the slot 46, shown in FIGS. 4 and 5, in the wall 42 and through the hole 90 in the slide member 70 until the hole 96 in the pin 94 shown in FIG. 7 is centered in the slot 98. When the hole 96 is thus centered, the end of the pin 94 on the side of the arm 74 having the arm extension 118 will be flush with that side of the arm and the opposite side of pin 94 will extend beyond the opposite side of the arm 74 in slidable engagement with the slot 46 of the frame member 26. The free end of the cable 22 is then introduced through the slot 98 into and through the hole 96 in the pin 94 until the cable termination 106 rests in the shaped receptacle 102. The cylindrical collar 56 is placed between the walls 38 and 42 with its open ends proximate the bolt holes 55 in each wall. See FIGS. 3, 4, and 5. The bolt 54 is introduced through the hole 55 in one wall, extended through the cylindrical collar 56 and into the hole 55 in the opposite wall of the frame member 26. The bolt 54 is secured by threaded engagement with mating threads in the opposite wall or by other means known to those skilled in the art. A press-fit pin or other secure mounting means can, of course, be used in lieu of the bolt 54. The free end of cable 22 is then slipped under the mounted cylindrical collar 56 as shown in the Figures.

Figure 6:
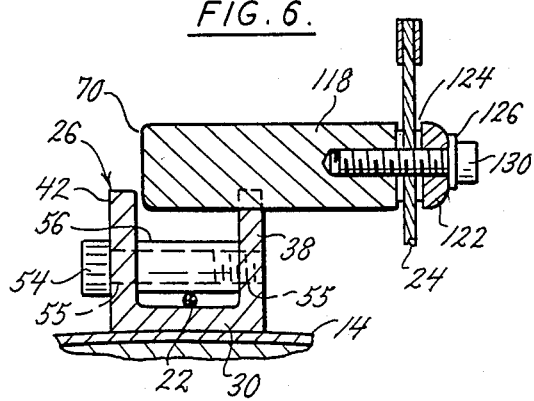
FIG. 6 is a partial sectional view of the present invention taken along line 6—6 of FIG. 4.

Assembly of the arm extension 118 is completed, as depicted in FIGS. 3 and 6 by passing the bolt 130 bearing the washer 126 through the cap 122 so that it is straddled by the cable 24 in the slot 124 and then securing it in the threaded hole 120 in the arm extension 118. The cable 24 runs from the arm extension 118 to the ram air turbine 15 where attachment is effected at the time of weapon assembly. Next the slide control pin 58 is inserted through the hole 59 in one wall of the frame member 26, the slot 78 in the arm 74 and into the hole 59 in the other wall of frame member 26. The arm 74 is, thus, movably constrained within the frame member 26. Before final assembly of the arm 74 within the frame member 26 the motion translator 10 is mounted to the air frame 14 by means of screws or bolts through the mounting holes 35, as seen in FIGS. 4 and 5. The arm 74 is then moved downward into the frame member 26 until the arm extension 118 rests in the cradle 50. The shear pin 66 as shown in FIG. 3 is then disposed through the shear pin hole 68 of the arm 74 and between the shear pin holes 67 in the walls 38 and 42 of the frame member 26. Likewise, the removable lock pin 62 is inserted in the lock pin holes 64 in the walls 38 and 42 of the frame member 26 and the lock pin hole 65 in the arm 74 of the slide member 70 disposed therebetween. See FIGS. 1 and 3.

OPERATION

The motion translator 10 is shown in FIG. 1 mounted to the weapon air frame 14. During pre-flight storage and handling the safety lock pin 62 is in place in the lock pin holes 64 of the frame member 26 as seen in FIGS. 1 and 3. This keeps the slide member 70 from being accidentally moved. Prior to flight operations the pin 62 is removed. The shear pin 66 which extends between the walls 38 and 42 of the frame member 26 and through the arm 74 of the slide member 70 holds the arm 74 in place against the effects of wind loading prior to weapon release. The cable 22 which extends from the slotted end of the arm 74 and beneath the cylindrical collar 56 mounted by means of the bolt 54 between the walls 38 and 42 of the frame member 26 connects to an appropriate point on the weapon rack 17. When the weapon is released from the rack 17, the cable 22 is caused to pull on the slotted end of the arm 74. Within the range of plus or minus thirty degrees (30°) on either side of the longitudinal centerline of the frame member 26 which is parallel to the longitudinal centerline of the weapon, the cable 22 is channeled between the walls 38 and 42 and the cylindrical collar 56 and the base 30 of the frame member 26 so that the force applied to and transmitted through the cable 22 is, as the weapon disengages and falls from the weapon rack 17, efficiently communicated to the slotted end of the arm 74 by the resultant force from the cable termination 106 acting upon the shaped receptacle 102. The arm 74 is thus caused to move simultaneously forward and up by virtue of the slidable containment imposed on it by the arm pin 94 in the arm 74 moving horizontally forward in the slot 46 of the frame member 26 and the slide control pin 58 above the slot 46 and between the walls 38 and 42 of the frame member 26 which cause the rotation upward of the arm 74. As the arm 74 is thus caused to rotate upwards, the shear pin 66 is ruptured, and the cable 24 from the arm extension 118, which is being lifted off of the cradle 50, to the ram air turbine 15 communicates the resultant lifting force to the turbine 15 causing it to be lifted out of its storage compartment in the body of the weapon and rotated into position with its axis of rotation generally in parallel alignment with the longitudinal axis of the weapon. In this position the air flow past the weapon causes the turbine 15 to rotate and thus generate the required electrical output. Once the ram air turbine is thus operationally positioned, the cable 22 which is fully extended is subjected to the full weight of the launched weapon. The single strand release segment 23 disengages as a result of the tension force it bears as the weapon moves away from the weapon rack 17.

Many changes and modifications of the above described embodiment of the invention may be made for various operational applications without departing from the scope thereof which should only be limited by the appended claims.

What I now claim is:

1. A motion translation device that converts an applied horizontal force to a generally vertical force, comprising:

a means for translating an applied horizontal force to a generally vertical force by a combination of confined sliding and rotational action, said means having a free end and slidably and rotationally confined end;

a means for slidably and rotationally confining said translating means between a first generally horizontal position and a second generally vertical position relative to said confining means;

a means for mounting said means for slidably and rotationally confining to another object;

and a means connected to said slidably and rotationally confined end of said translating means for communicating a generally horizontal force to said translating means.

2. The device of claim 1 wherein said translating means has a first pin extending laterally therethrough and protruding beyond one side of said translating means, and said confining means has a generally longitudinal slot for slidably and rotationally receiving the protruding portion of said first pin.

3. The device of claim 2 wherein said translating means has a slot extending therethrough with a first leg running substantially longitudinally with said means and a second leg running at an angle with said first leg, and said confining means has a second pin extending therefrom and movably engaging said slot in said translating means.

4. The device of claim 3 wherein said translating means has an extension having a free end and an opposite end affixed to said translating means, said extension extending laterally from one side of the free end of said translating means opposite said first pin.

5. The device of claim 4 wherein said extension has a means affixed to its free end for communicating said vertical force to an attached object.

6. The device of claim 5 wherein said confining means has means for bearing the end of said extension when said translating means is in said first generally horizontal position.

7. The device of claim 6 wherein said confining means has means for maintaining said translating means in said first generally horizontal position relative to said confining means until a sufficient force is applied to said translating means to move it past said maintaining means.

8. The device of claim 7 wherein said confining means has a means for locking said translating means in said first generally horizontal position relative to said confining means until said locking means is removed from said confining means.

9. A movement translation device mounted to a first object and connected to a second object, that converts an applied horizontal force to a vertical force for moving a third object, comprising:

a frame member having a base with two opposing and parallel walls extending normal from one side of said base, one of said walls having a slot extending therethrough substantially longitudinal therewith and facing the second of said walls;

a slide member having a slot extending laterally therethrough and running substantially longitudinally along said slide member;

a first pin located at one end of and extending laterally from the side of said slide member facing the wall of said frame member having said slot, said first pin extending into said slot in said wall of said frame member for slidable engagement therewith;

a second pin affixed between the two walls of said frame member and extending through the slot in said slide member for slidable engagement therewith;

a means for mounting said device to said first object; and, a cable having two ends, the first end of said cable affixed to said slide member proximate to said first pin and running between said slide member and said frame member towards the end of said frame member opposite said first pin and the second end of said cable affixed to said second object, for communicating a generally horizontal force to said slide member.

10. The movement translation device of claim 9 wherein said slide member comprises an arm portion containing said slot and said first pin, and an extension lateral from the end of said arm opposite the end bearing said first pin, said extension having one end affixed to said arm portion and an opposite free end.

11. The movement translation device of claim 10 wherein the free end of said extension includes a means for communicating a force from said slide member to said third object object.

12. The movement translation device of claim 11 wherein said slot in said slide member has a first leg running substantially longitudinally along said member and second leg extending at an angle from said first leg.

13. The movement translation device of claim 12 wherein said frame member and said slide member contain corresponding holes and a removable lock pin therethrough.

14. The movement translation device of claim 13 wherein said frame member and said slide member contain corresponding holes at the end of said device proximate to said first pin and a shear wire extending through said corresponding holes.

15. The movement translation device of claim 14 wherein said frame member wall opposite said wall having said slot contains a cradle to accommodate said lateral extension of said arm when said slide member is in said first position generally parallel to said frame member.

* * * * *